United States Patent [19]

Madderra et al.

[11] 3,933,685

[45] Jan. 20, 1976

[54] METHOD FOR PRODUCING CATALYST IMPREGNATED ALUMINA EXTRUDATES

[75] Inventors: Galen K. Madderra; William C. Ziegenhain, both of Ponca City, Okla.

[73] Assignee: Continental Oil Company, Ponca City, Okla.

[22] Filed: July 19, 1974

[21] Appl. No.: 489,959

[52] U.S. Cl. ............... 252/464; 252/463; 252/465; 252/466 J
[51] Int. Cl.$^2$ ................... B01J 21/04; B01J 23/16; B01J 23/74
[58] Field of Search.......... 252/463, 464, 465, 466 J

[56] References Cited
UNITED STATES PATENTS

| | | | |
|---|---|---|---|
| 2,809,170 | 10/1957 | Cornelius et al. | 252/465 |
| 2,917,365 | 12/1959 | Gilbert | 252/463 X |
| 2,932,620 | 4/1960 | VonFuener et al. | 252/463 X |
| 2,952,644 | 9/1960 | Holden | 252/465 |
| 3,353,910 | 11/1967 | Cornelius et al. | 252/463 X |
| 3,403,111 | 9/1968 | Colgan et al. | 252/463 X |

*Primary Examiner*—W. J. Shine
*Attorney, Agent, or Firm*—F. Lindsey Scott

[57] ABSTRACT

An improvement in a method for producing alpha alumina monohydrate extrudates by mixing acid, water, and alpha alumina monohydrate to form an extrudable mixture; extruding the mixture to produce green alpha alumina monohydrate extrudates and drying the green extrudates, wherein the improvement comprises, contacting the green extrudates with an aqueous solution of catalytic metals in an amount sufficient to impregnate the extrudates with the catalytic metals thus improving the extrudate properties and impregnating the extrudates with catalytic metals.

7 Claims, No Drawings

METHOD FOR PRODUCING CATALYST IMPREGNATED ALUMINA EXTRUDATES

This invention relates to alpha alumina monohydrate extrudates. This invention further relates to an improvement in methods for producing alpha alumina monohydrate extrudates whereby the extrudates are impregnated with catalytic metals. This invention further relates to an improvement in methods for extruding alpha alumina monohydrate whereby the surface area of the extrudate particles is improved.

It is well known that alumina particles are desirable as catalyst supports and catalysts for a variety of catalytic reactions and processes. As a result, much time and effort have been devoted to a search for improved methods for producing extrudates of alumina having such desirable properties as high crush strength, low bulk density, high pore volume, high surface area, and the like for use as catalyst supports and catalysts. Very desirable alumina particles are produced by mixing from about 0.3 to about 2.0 parts acid, from about 36 to about 50 parts water, and about 50 parts finely divided alpha alumina monohydrate to form an extrudable mixture, thereafter extruding the mixture and drying to produce alpha alumina monohydrate extrudates. Such extrudates are desirable for their catalytic activity as catalyst supports. A disadvantage of such alumina particles is that the particles are not stable with respect to water and have been observed to disintegrate rapidly when immersed in aqueous solutions. It is common in the catalyst industry to incorporate catalytic elements into alumina support particles by forming aqueous solutions of catalytic components and thereafter immersing the alumina particles in said aqueous solutions. Obviously the instability of the alumina particles to water results in difficulty in formulating catalysts by conventionally used methods.

One attempt to overcome this difficulty is described in U.S. Ser. No. 364,773, entitled "Stabilized Alpha Alumina Monohydrate Extrudates," filed May 31, 1973, by William C. Ziegenhain and Galen K. Madderra now Defensive Publication T929,001.

Much time and effort has been devoted to a continuing search for a method for impregnating such alumina particles with catalytic metals without causing disintegration of the alumina particles in aqueous solution.

It has now been found that desirable alpha alumina monohydrate extrudates are produced by an improvement in a method for producing alpha alumina monohydrate extrudates by mixing acid, water, and alpha alumina monohydrate to form an extrudable mixture, extruding the mixture to produce green alpha alumina monohydrate extrudates and drying the green extrudates. The improvement comprises contacting the green extrudates with an aqueous solution of catalytic metals in an amount sufficient to impregnate substantially the entire volume of the extrudates with the aqueous solution of catalytic metals, which upon drying results in an improvement of the extrudate properties and impregnation of the extrudates with catalytic metals.

In the extrusion of alpha alumina monohydrate, a commonly used procedure comprises mixing from about 0.3 to about 2.0 weight percent acid with from about 36 to about 50 parts water and 50 parts finely divided alpha alumina monohydrate to form an extrudable mixture and thereafter extruding to produce green alpha alumina monohydrate extrudates. The extrudates are then normally dried to about 60 to 80 weight percent $Al_2O_3$. As is well known to those skilled in the art, alpha alumina monohydrate, per se, contains about 85 percent $Al_2O_3$ with the balance being water. The water remaining in the dried extrudates is water of hydration, free water and the like. Alumina extrudates dried to 60 to 85 weight percent are normally considered as dried alumina extrudates although they may contain up to about 25 weight percent water as free water.

The alumina is normally mixed with the water and acid to form a dough-like extrudable mixture which is then extruded by the use of screw extruders, hydraulic extruders, and the like as is well known to those skilled in the art. No particular novelty is claimed in any particular extrusion apparatus or technique nor in the formation of the extrusion mixture, other than as methods with which Applicant's claimed improvement is effective.

Suitable acids are inorganic acids, aliphatic carboxylic organic acids containing from 1 to 3 carbon atoms and halogenated aliphatic carboxylic acids containing from 2 to 3 carbon atoms. Some such acids are hydrochloric acid, nitric acid, sulfuric acid, formic acid, propionic acid, acetic acid, monochloroacetic acid, dichloroacetic acid, and the like. Of these acids, hydrochloric acid, nitric acid, and acetic acid are more commonly used.

The alpha alumina monohydrate is typically produced by the alum process, the sodium aluminate process, or the water hydrolysis of aluminum alkoxides. Alpha alumina monohydrate produced by the water hydrolysis of alumina alkoxides is preferred. Such alumina is produced by a process comprising hydrolyzing aluminum alkoxides such as those produced by the Ziegler process with an excess of water to form an alcoholic organic portion and an aqueous alumina portion, thereafter separating the aqueous alumina portion from the organic portion and drying to produce alpha alumina monohydrate. One such alpha alumina monohydrate product is marketed by Continental Oil Company of 30 Rockefeller Plaza, New York, New York, under the trademark CATAPAL. The physical properties of such alumina are typically as follows:

| | | |
|---|---|---|
| 1. | Crystal structure | alpha alumina monohydrate |
| 2. | Crystal structure after calcining at 900°F for 3 hours | gamma alumina |
| 3. | Ultimate size (X-ray diffraction) | |
| | 020 reflection | 37 angstroms |
| | 021 reflection | 65 angstroms |
| | 440 reflection | 45 angstroms |
| 4. | Pore Volume (cc/g) | 0.35–0.65 |
| 5. | Loose Bulk Density (lb/ft$^3$) | 35–70 |
| 6. | Particle Size Distribution (sieve) | |
| | >45 microns | 20% |
| | <45 microns | 80% |
| 7. | $Al_2O_3$ Content (wt %) | 65–85 |
| 8. | Loss on Ignition (wt %) | 15–35 |
| 9. | Surface Area (in$^2$/g) | 150–350 |

Another suitable alpha alumina monohydrate is marketed by Kaiser Chemicals of Baton Rouge, Louisiana, under the trademark KCSA. This alumina is produced by a variation of the sodium aluminate process.

Alpha alumina monohydrate produced by the alum process is also suitable, as will be shown more fully hereinafter.

In the practice of the improvement of the present invention, extrudates are produced in the normal manner up through the extrusion step. After extruding the mixture to produce the undried i.e., green extrudates, the green extrudates are sprayed with or dipped into an aqueous solution of catalytic metals.

When dipping is used, the green extrudates are dipped into the aqueous solution for a time at least sufficient to saturate the extrudates with the aqueous solution. This time is normally relatively short and times of at least 5 seconds are preferred. In most instances, the saturation of the extrudates will be accomplished in from 5 seconds to 2 minutes.

When spraying, a sufficient amount of spray is used to result in substantially completely impregnating the extrudate particles with the aqueous solution. The degree of saturation is readily determined by breaking the dried extrudates and determining the penetration of the metals. The degree of penetration is readily determined by observation of the discoloration which results upon impregnation of the alumina extrudates with catalytic metals.

It is readily seen that by the improvement of the present invention, the second drying step is eliminated. Heretofore it has been necessary to dry the green extrudates to from about 65 to 85 weight percent $Al_2O_3$ and thereafter immerse the dried extrudates in aqueous solutions of catalytic metals. Clearly, the extrudate particles then require a second drying step. It is readily seen that the improvement of the present invention eliminates the second drying step and obviates the necessity of spraying and steaming as shown in U.S. Ser. No. 364,773, referenced hereinbefore.

Suitable aqueous solutions of catalytic metals are those known to those skilled in the art, although preferred solutions are those containing polyvalent, catalytic metals. Typically such solutions contain metals such as cobalt, molybdenum, nickel, vanadium, tungsten, mixtures thereof, and the like, either as the metals or as salts of the metals such as oxides, halides, hydroxides, carbonates, sulfates, phosphates, nitrates, citrates, oxalates, metallic acids and salts such as molybdic acid, molybdate salts, and the like. In many instances, the metals will be in combination on the alumina extrudate. Desirably, a first component is selected from the group consisting of nickel and cobalt, and a second component is selected from the group consisting of molybdenum and tungsten when preparing desulfurization catalysts. The preparation of such solutions is well known to those skilled in the art. Such solutions as are used commonly for impregnating dried catalysts are suitable in the improvement of the present invention with the only real restrictions being that the catalytic metal must be present in an effective amount to provide the desired amount of metal in the alumina extrudate. It is readily seen that the concentration of the catalytic metal in the aqueous solution will determine the length of time during which the extrudate is immersed in an aqueous solution, the amount of spraying required, and the like.

In a desirable variation of the present invention, two or more metals are readily deposited on alumina extrudates by first contacting the green alumina extrudate with an aqueous solution containing one of the catalytic metals and thereafter contacting with an aqueous solution containing the second catalytic metal. Either spraying or dipping can be used. Both metals are thus present in the alumina extrudate. Obviously, many aqueous solutions of catalytic metals are known to those skilled in the art and such solutions are suitable in the practice of the improvement of the present invention, although as noted hereinbefore, those aqueous solutions wherein polyvalent, catalytic metals are dissolved are preferred.

The drying step is conducted after contacting by dipping or spraying the green extrudates. The drying may be accomplished by the same methods and equipment as is used when the green extrudates are not sprayed or dipped.

It is clear that the improvement of the present invention thus results in a substantial increase in efficiency in that one drying step is eliminated and a bothersome problem, namely the disintegration of alpha alumina monohydrate extrudates upon contact with aqueous environments, is eliminated.

A further and unexpected advantage is also realized. When alpha alumina monohydrate produced by the water hydrolysis of aluminum alkoxides is used as the starting material, it has been observed that a surprising and unexpected increase in surface area is obtained upon contacting or spraying the green extrudates with the aqueous solutions of catalytic metals. No adequate explanation is known to applicants for this increase in surface area at a point in the process wherein normally the surface area is decreased by further contacts with aqueous solutions.

It has been further observed that when contacting or spraying alpha alumina monohydrate produced by the sodium aluminate process slight increases in pore volume were obtained. No suitable explanation for this increase in pore volume is known since further aqueous contact at this point would be expected to result in a decrease in pore volume.

Having thus described the invention, it is pointed out that the foregoing description of preferred embodiments is illustrative rather than limiting in nature and that many variations and modifications within the scope of the present invention are possible and may be considered obvious or desirable to those skilled in the art upon a review of the foregoing description of the preferred embodiments and the following examples.

EXAMPLES

EXAMPLE 1

750 grams of CATAPAL alumina, 375 milliliters of distilled water, and 375 milliliters of 3 volume percent acetic acid in water were mixed in a Baker-Perkins blender using a total mixing time of 30 minutes, and thereafter extruded through a 1/16-inch die. A portion of the extrudate was dried overnight at 250°F and then calcined at 900°F as a base case product.[1] A separate portion of the green extrudate was sprayed with 75 milliliters of an aqueous solution of catalytic metals, dried at 250°F for three hours. The analysis of the two samples is as follows.

[1]Drying and calcining were at 250°F overnight followed by calcining at 900°F for three hours unless otherwise stated in all the tests.

|  | Base Case: No Metal Deposition | Metal Sprayed on Green Extrodate |
| --- | --- | --- |
| Surface area, m²/g | 251.3 | 328.0 |
| Average crush, lbs | 10.5 | 7.7 |
| Pore Volume, cc/g | 0.65 | 0.50 |
| Wt.%, Cobalt Oxide (CoO) | — | 2.9 |
| Wt.%, MoO₃ | — | 13.8 |

The aqueous solution of catalytic metals was prepared by the following procedure. 48 grams of molybdenum trioxide was dissolved in 60 cc of ammonium hydroxide (28–29 wt % ammonia in water) at 60°C. Following complete solution, the pH of the solution was adjusted to 5.0 by the addition of nitric acid. 49 grams of cobalt hydrate was then mixed with 64 cc of distilled water and the mixture was added to the molybdenum trioxide solution. The pH of the total mixture was then adjusted to 3.7 using nitric acid.

A substantial increase in the surface area of the green extrudate sprayed with the aqueous solution of catalytic metals was observed.

EXAMPLE 2

A second test, similar to the first test, was performed and portions of the extrudate product were tested as follows: (1) A base case product was prepared with no metals deposition. (2) 242 grams of "green" extrudate was sprayed with 70 grams of catalyst solution, dried, and calcined. The test results are shown below.

|  | Base Case | Spray-Coated Product |
|---|---|---|
| Surface area, $m^2/g$ | 262.9 | 306.7 |
| Average crush, lbs | 9.9 | 8.0 |
| Pore volume, cc/g | 0.65 | 0.56 |
| Wt.%, Cobalt Oxide CoO) | — | 2.6 |
| Wt.%, $MoO_3$ | — | 7.0 |

The same aqueous solution of catalytic metals described in Example 1 was used, and again it will be noted that a considerable increase in surface area was achieved. No cracking was noted during the coating procedure. A lower metal content extrudate was produced since a much smaller amount of aqueous catalyst solution was used as a spray.

EXAMPLE 3

A third test similar to Tests 1 and 2 was conducted. Portions of the extrudate were tested as follows: (1) Base case—no metals deposition, dried, and calcined. (2) Green extrudate was submerged in the cobalt-molybdenum catalyst solution described in Example 1 for 30 seconds, then dried and calcined. (3) Green extrudate was submerged in distilled water for 30 seconds, then dried and calcined. The test results were as follows.

|  | Surface Area $m^2/g$ | Crush Pounds | Pore Volume cc/g | Wt % CoO | Wt % $MoO_3$ |
|---|---|---|---|---|---|
| 1. Base Case | 261.2 | 10.2 | 0.60 | — | — |
| 2. Green Extrudate Dipped in Catalyst | 317.8 | 8.5 | 0.48 | 3.3 | 10.3 |
| 3. Dipped in Distilled Water | 246.7 | 9.8 | 0.6 | — | — |

It is noted that an increase in surface area was achieved by dipping the green extrudate in the catalyst solution and then drying, while dipping the extrudate in distilled water showed no increase in surface area and, in fact, resulted in a loss of surface area. There was no tendency to crack in any of the tests.

EXAMPLE 4

A Kaiser KCSA grade alumina was extruded by mixing 750 grams of alumina with 375 milliliters of 3 volume percent acetic acid in water over a four minute period and thereafter adding 250 milliliters of distilled water with continued mixing over a 7 minute period for a total mixing time of 11 minutes to produce an extrudable mixture which was thereafter extruded. A portion of the extrudates was dried and calcined as a base case. A second portion of the green extrudates was dipped in the aqueous catalyst solution described in Example 1 for 10 seconds and thereafter dried and calcined. 575 grams of the green extrudate were sprayed with 135 grams of the aqueous solution of catalytic metals of Example 1 and thereafter dried and calcined. The extrudate properties were as follows.

| Deposition Method | Surface Area, $m^2/gm$ | Pore Vol. cc/gm | METALS Wt % Cobalt | Wt % Moly | EXTRUDATE CRUSH STRENGTH (LB) Lo | Hi | Avg. |
|---|---|---|---|---|---|---|---|
| None - Base Case | 335 | 0.58 | — | — | 16.5 | 32.5 | 25.2 |
| None - Base Case | 315 | 0.61 | — | — | 18 | 22 | 20.1 |
| Dipped | 321 | 0.67 | 3.9 | 11.0 | 2.0 | 33 | 24.5 |
| Sprayed | 321 | 0.67 | 3.0 | 10.0 | 16 | 36 | 27.3 |

EXAMPLE 5

Alpha alumina monohydrate was produced by precipitating alumina from a solution containing 25 weight percent alum ($Al_2(SO_4)_3$) in water. Ammonia was added until alumina precipitated. The precipitated alumina was then recovered by filtration and carefully washed with distilled water to remove all of the sulfate ion. The alumina powder was then dried to about 70 weight percent $Al_2O_3$. 86 grams of the alumina was mixed with 43 milliliters of 3 volume percent acetic acid and thereafter mixed with 30 milliliters of distilled water. An additional 7.5 milliliters of 3 volume percent acetic acid and water were then added with continued mixing. A portion of the extruded material was dried and calcined as a base case. A second portion of the green extrudate was dipped in the catalyst solution of Example 1 for 10 seconds and thereafter dried and calcined. 25 grams of the green extrudate were sprayed with 30 milliliters of the catalyst solution of Example 1 and thereafter dried and calcined. The extrudate properties are shown below.

| Deposition Method | Surface Area, m²/gm | Pore Vol. cc/gm | METALS W/O Cobalt | METALS W/O Moly | EXTRUDATE CRUSH STRENGTH Lo | EXTRUDATE CRUSH STRENGTH Hi | EXTRUDATE CRUSH STRENGTH Avg. |
|---|---|---|---|---|---|---|---|
| Sprayed | 252 | 0.16 | 4.7 | 22 | 6 | 15 | 8.9 |
| Dipped | 262 | 0.13 | 5.2 | 21 | 6 | 16 | 9.9 |
| None — Base Case | 293 | 0.36 | — | — | 9 | 27 | 17.1 |

It will be observed that in the tests using the alpha alumina monohydrate produced by the water hydrolysis of aluminum alkoxides, i.e., Example 1–3, a surprising and unexpected increase in the surface area of the extrudate particles was achieved.

When the alpha alumina monohydrate is produced by other processes such as the sodium aluminate process, other properties tend to be improved, such as the pore volume, as shown in Example 4.

The alum-produced alpha alumina monohydrate showed little improvement upon spraying or dipping. It is noted, however, that it is unusual that catalyst materials can be impregnated into the alumina extrudate with no substantial loss of desirable properties, and it is particularly surprising that certain desirable properties could, in fact, be improved during the impregnating step.

In all tests described herein it was observed upon breaking the extrudates that the alumina was discolored to the center of the extrudate particles indicating that the extrudates were completely impregnated with the catalytic metals. In most instances the discoloration appeared to be relatively uniform, thus indicating that the catalytic metals were relatively uniformly distributed throughout the extrudate particles.

In Example 3, it will be noted that merely dipping the green extrudates in distilled water has no beneficial effects comparable to those achieved by dipping the green alumina extrudate in solutions of catalytic metals.

Having thus described the invention, we claim:

1. In a method for producing catalyst impregnated alumina extrudates by admixing acid, said acid being selected from the group consisting of inorganic acid, aliphatic carboxylic organic acid containing from 1 to 3 carbon atoms, halogenated aliphatic carboxylic acid containing from 2 to 3 carbon atoms and mixtures thereof, water and alpha alumina monohydrate to form an extrudable mixture, extruding the mixture to produce green alpha alumina monohydrate extrudates and drying and calcining said green extrudates, the improvement comprising; impregnating said green extrudates prior to said drying with an aqueous solution of a catalytic metal compound selected from the group consisting catalytic metal salt, catalytic metal oxide, catalytic metal hydroxide, catalytic metal acid and mixtures thereof in an amount sufficient to impregnate substantially the entire volume of said extrudates with said catalytic metal compound thereby improving the extrudate properties.

2. The improvement of claim 1 wherein said acid is selected from the group consisting of hydrochloric acid, nitric acid, sulfuric acid, formic acid, propionic acid, acetic acid, monochloroacetic acid and dichloroacetic acid.

3. The improvement of claim 2 wherein said green extrudates are immersed in said aqueous solution for at least 5 seconds.

4. The improvement of claim 3 wherein said aqueous solution contains a catalytic compound of a metal selected from the group consisting of cobalt, molybdenum, nickel, vanadium, tungsten and mixtures thereof.

5. The improvement of claim 2 wherein said green extrudates are sprayed with said aqueous solution.

6. The improvement of claim 5 wherein said aqueous solution contains a catalytic compound of a metal selected from the group consisting of cobalt, molybdenum, nickel, vanadium, tungsten and mixtures thereof.

7. The improvement of claim 1 wherein said alpha alumina monohydrate is produced by the water hydrolysis of aluminum alkoxides.

* * * * *